US011953179B2

(12) United States Patent
Shivapurkar et al.

(10) Patent No.: US 11,953,179 B2
(45) Date of Patent: Apr. 9, 2024

(54) POST-TOP LIGHT FIXTURE

(71) Applicant: SIGNIFY HOLDING B.V., Eindhoven (NL)

(72) Inventors: Kunal Shivapurkar, Pune (IN); Rajesh Narayan Kalbhor, Pune (IN); Sridhar Reddy Nimma, Cumming, GA (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/033,861

(22) PCT Filed: Oct. 19, 2021

(86) PCT No.: PCT/EP2021/078964

§ 371 (c)(1),
(2) Date: Apr. 26, 2023

(87) PCT Pub. No.: WO2022/090000

PCT Pub. Date: May 5, 2022

(65) Prior Publication Data

US 2024/0052984 A1 Feb. 15, 2024

Related U.S. Application Data

(60) Provisional application No. 63/108,596, filed on Nov. 2, 2020.

(30) Foreign Application Priority Data

Nov. 10, 2020 (EP) .................................... 20206762

(51) Int. Cl.
*F21S 8/08* (2006.01)
*F21V 17/10* (2006.01)
*F21V 19/00* (2006.01)
*F21V 23/00* (2015.01)

(52) U.S. Cl.
CPC ............ *F21S 8/085* (2013.01); *F21V 17/107* (2013.01); *F21V 19/003* (2013.01); *F21V 23/005* (2013.01)

(58) Field of Classification Search
CPC ..................................................... F21V 17/107
See application file for complete search history.

(56) References Cited

U.S. PATENT DOCUMENTS 3,202,815 A * 8/1965 Buell ...................... F21V 15/01 362/294
3,387,737 A * 6/1968 Baldwin ............... F21V 17/107 273/126 R
3,590,237 A * 6/1971 Winters ................ F21V 17/164 49/465

(Continued)

FOREIGN PATENT DOCUMENTS

CA 3001192 A1 10/2019
KR 101576872 B1 12/2015

(Continued)

*Primary Examiner* — Zheng Song

(57) ABSTRACT

A light fixture (100) includes a carriage (104), a hood (102) rotatably attached to the carriage (104), and a light engine (150, 900, 1108) that includes a plate (110, 902) and a light module (112, 926). The light module (112, 926) is attached to the plate (110, 902), and the plate (110, 902) is rotatably attached to the carriage (104).

13 Claims, 19 Drawing Sheets

(56) References Cited

U.S. PATENT DOCUMENTS

| | | | | | |
|---|---|---|---|---|---|
| 3,748,465 | A * | 7/1973 | Murray | F21V 17/107 362/374 |
| 5,440,466 | A | 8/1995 | Belisle et al. | |
| 2007/0070628 | A1* | 3/2007 | Chen | F21V 29/75 362/249.01 |
| 2008/0232094 | A1* | 9/2008 | Ramsdell | F21S 8/088 362/183 |
| 2010/0254134 | A1* | 10/2010 | McCanless | F21S 8/088 362/249.02 |
| 2015/0260362 | A1* | 9/2015 | Koga | H05B 47/175 362/362 |
| 2017/0114986 | A1* | 4/2017 | Girouard | F21S 8/086 |
| 2017/0234490 | A1* | 8/2017 | Dahlen | F21V 29/76 362/294 |

FOREIGN PATENT DOCUMENTS

| | | | | | |
|---|---|---|---|---|---|
| KR | 101648412 | B1 | | 8/2016 | |
| KR | 101654683 | B1 | | 9/2016 | |
| WO | WO 2013/001485 | | * | 1/2013 | F21V 17/107 |
| WO | 2015063807 | A1 | | 5/2015 | |
| WO | WO 2018/004760 | | * | 1/2018 | H05K 5/0226 |

* cited by examiner

POST-TOP LIGHT FIXTURE

CROSS-REFERENCE TO PRIOR APPLICATIONS

This application is the U.S. National Phase application under 35 U.S.C. § 371 of International Application No. PCT/EP2021/078964, filed on Oct. 19, 2021, which claims the benefits of U.S. Patent Application No. 63/108,596, filed on Nov. 2, 2020 and European Patent Application No. 20206762.5, filed on Nov. 10, 2020. These applications are hereby incorporated by reference herein.

TECHNICAL FIELD

The present disclosure relates generally to light fixtures, and more particularly to post-top light fixtures with features that simplify repair, maintenance, and replacement.

BACKGROUND

Some top-post light fixtures include a hood, a light engine, and a carriage. The light engine is generally positioned between the hood and the carriage and is typically secured to the carriage with screws. To access a cavity of the carriage, the screws securing to the carriage have to be removed. Further, because the light module of the light engine is generally on the side of the light engine facing the cavity of the carriage, testing and/or replacing the light module requires the removal of the light engine from the carriage by removing the screws securing the light engine to the carriage. In some cases, the need to remove screws to access the cavity of the carriage and to test and/or replace the light module of the light engine may be inconvenient. Thus, a solution that eliminates or reduces the need to use screws for the secure attachment of the light engine to the carriage may be desirable.

SUMMARY

The present disclosure relates generally to light fixtures, and more particularly to post-top light fixtures with features that simplify repair and maintenance. In an example embodiment, a light fixture includes a carriage, a hood rotatably attached to the carriage, and a light engine that includes a plate and a light module. The light module is attached to the plate, and the plate is rotatably attached to the carriage.

These and other aspects, objects, features, and embodiments will be apparent from the following description and the appended claims.

BRIEF DESCRIPTION OF THE FIGURES

Reference will now be made to the accompanying drawings, where.

Figure 1A:
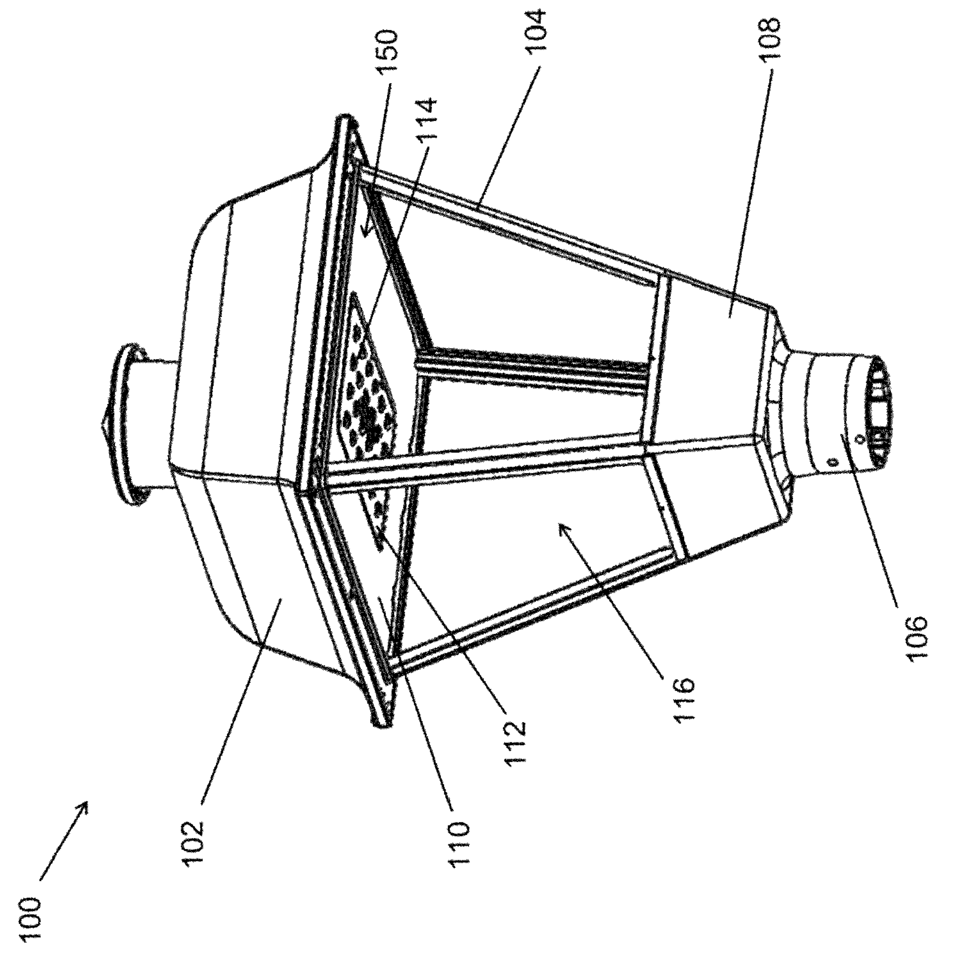
FIGS. 1A-1C illustrate a top-post light fixture according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Figure 1B:
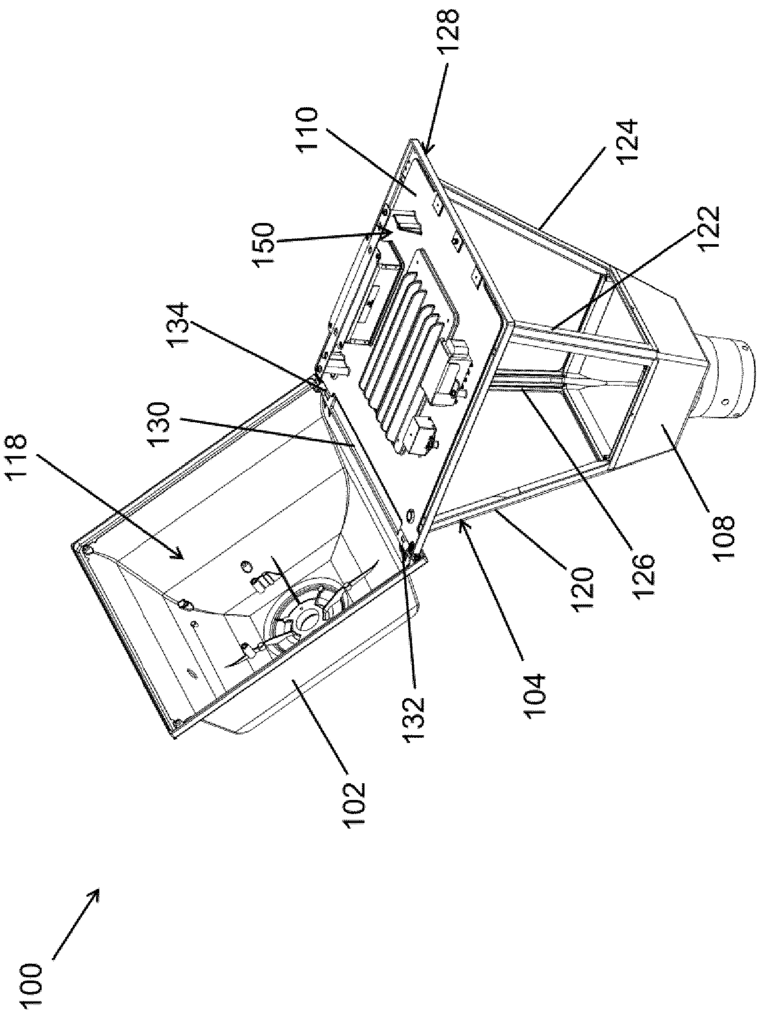
Figure 1C:
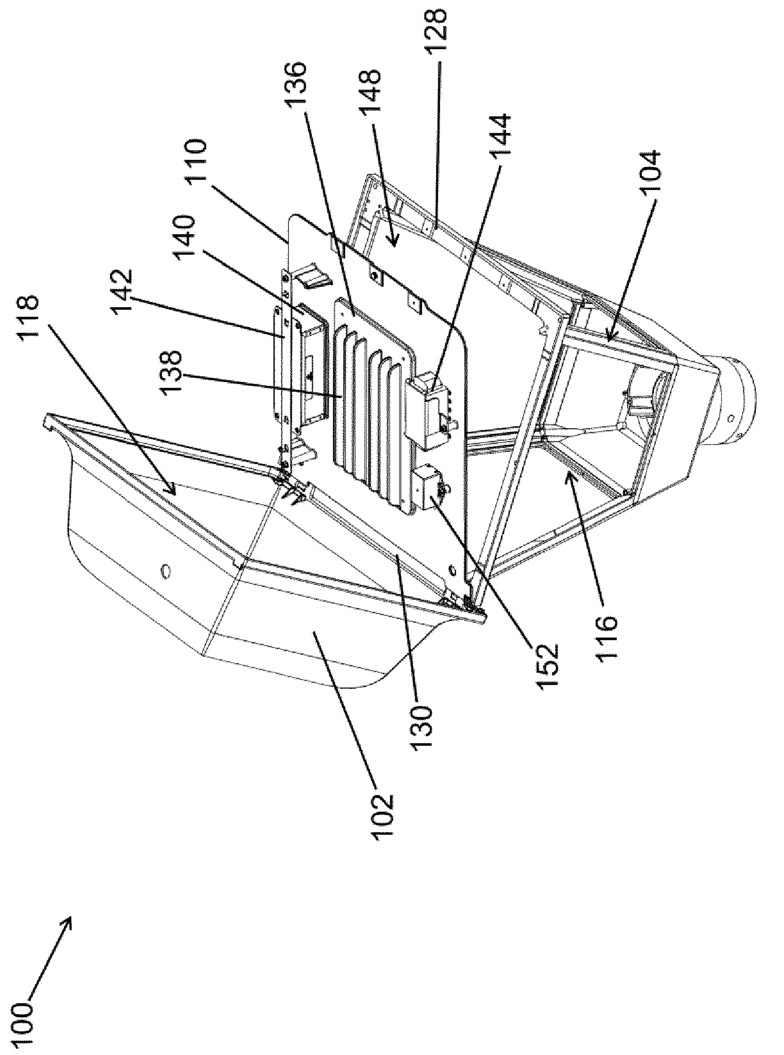

FIGS. 1A-1C illustrate a top-post light fixture 100 according to an example embodiment. In some example embodiments, the light fixture 100 includes a hood 102, a carriage 104, and a light engine 150 that includes a plate 110. As explained in more detail below, the hood 102 and the plate 110 may be rotatably attached to the carriage 104.

In some example embodiments, the light engine 150 may include a light module 112 that is attached to the plate 110. The light module 112 may include light sources 114, such as light emitting diode (LED) light sources, positioned to emit light toward a cavity 116 of the carriage 104. The light module 112 may be positioned in a recess section 136 formed in the plate 110 such that the light module 112 is flush with the portions of the plate 110 that surrounds the recess section 136. Fins 138 may extend from the back of the recess section 136 toward a cavity 118 of the hood 102 to dissipate heat generated by the light module 112 away from the plate 110. To illustrate, the fins 138 and the light module 112 may be on opposite sides of the recess section 136.

In some example embodiments, the light engine 150 may also include a driver 140 that provides power to the light module 112 using one or more electrical connections (e.g., electrical wires) as can be readily understood by those of ordinary skill in the art. The driver 140 may be secured to the plate 110 using a bracket 142 that is attached to the plate 110, for example, using fasteners. The light engine 150 may also include other components such as a transformer 144, a surge suppressor 152, etc. When the hood 102 is closed as shown in FIG. 1A, the cavity 118 of the hood 102 provides a space for some components the light engine 150 to be positioned therein.

In some example embodiments, the carriage 104 includes a post attachment section 106, a base 108, and a top frame 128. The base 108 may be attached to the post attachment section 106, and the post attachment section 106 may be used to attach the top-post light fixture 100 to a post (not shown) as can be readily understood by those of ordinary skill in the art. The carriage 104 may also include arms 120, 122, 124, 126 that are connected to and extend between the base 108 and the top frame 128. The base 108, the arms 120, 122, 124, 126, and the top frame 128 may define the cavity 116 of the carriage 104. An opening 148 of the carriage 104 may be bounded by the top frame 128 and may be used to access the cavity 116 of the carriage 104 from above the carriage 104. For example, lenses (not shown) may be inserted into the cavity 116 of the carriage 104 through the opening 148 and may be positioned between adjacent ones of the arms 120, 122, 124, 126 as can be readily understood by those of ordinary skill in the art.

In some example embodiments, the hood 102 and the plate 110 may be rotatably attached to the carriage 104 using hinge pins 132, 134 and attachment structures of the hood 102, the carriage 104, and the plate 110 as explained below in more detail. For example, the hinge pins 132, 134 may be used to rotatably attach the hood 102 and the plate 110 to an attachment section 130 of the top frame 128 of the carriage 104 that includes attachment structures.

To illustrate, in FIG. 1A, the hood 102 is in a closed position, where the hood 102 is closed over the carriage 104 and position on the top frame 128 and where the plate 110 covers the opening 148 (more clearly shown in FIG. 1C) of the carriage 104. The plate 110 may be positioned on the top frame 128 and cover the opening 148 when the hood 102 is in the closed position shown in FIG. 1A. In FIG. 1B, the hood 102 is shown in an open position after the hood 102 was rotated, for example, from the position shown in FIG. 1A while the plate 110 remained positioned on the top frame 128. In FIG. 1C, the hood 102 is shown in another open position after the hood 102 was rotated, for example, from the closed position shown in FIG. 1A or the open position shown in FIG. 1B, and the plate 110 was rotated such that the plate 110 is not positioned on the top frame 128. As can be seen in FIGS. 1A-1C, the hood 102 can be rotated independently of the plate 110, and the plate 110 can be rotated independently of the hood 102 when the hood 102 is in an open position. As explained in more detail below with respect to FIGS. 2A, 2B and 4, the plate 110 may also be rotatably attached to the carriage 104 such that the plate 110 can be detached (i.e., fully removed) from the carriage 104 without first removing the hood 102 from the carriage 104.

In some example embodiments, the hood 102 and the carriage 104 may be made from a suitable material (e.g., aluminum, etc.) using methods, such as die casting, as can be readily understood by those of ordinary skill in the art with the benefit of this disclosure. The plate 110 including the fins 138 may be made from a suitable material (e.g., aluminum, etc.) using methods (e.g., die casting) as can be readily understood by those of ordinary skill in the art with the benefit of this disclosure. In some alternative embodiments, the plate 110 may be made from one or more materials such as sheet metal using methods such as stamping, cutting, drilling, etc. as can be readily understood by those of ordinary skill in the art with the benefit of the scope of this disclosure.

By using the rotatable plate 110, the light fixture 100 provides an easy access to the cavity 116 of the carriage 104 through the opening 148 without requiring the removal of screws. The rotatability of the plate 110 also enables the maintenance, repair, and replacement of the light module 112 without requiring the removal of screws to access the light module 112. Because, in some example embodiments, the rotatability of the plate 110 enables the removal of the plate 110 from the carriage 104 without first removing the hood 102 and/or the hinge pins, the light fixture 100 simplifies the process of replacing the light engine 150.

In general, the hood 102 and the plate 110 may be rotated to positions other than shown in FIGS. 1A-1C without departing from the scope of this disclosure. In some alternative embodiments, some of the components of the light fixture 100 may be omitted without departing from the scope of this disclosure. In some alternative embodiments, some components of the light fixture 100 may have different shapes than shown without departing from the scope of this disclosure. For example, the light module 112 may have a non-rectangular shape. In some alternative embodiments, the light engine 150 may include more or fewer components than shown without departing from the scope of this disclosure. For example, the driver 140, the transformer 144, and/or the surge suppressor 152 may be omitted or separate from the light engine 150 without departing from the scope of this disclosure. In some alternative embodiments, the hood 102 and the plate 110 may be rotatably attached to the carriage 104 in a different manner than shown without departing from the scope of this disclosure.

Figure 2A:
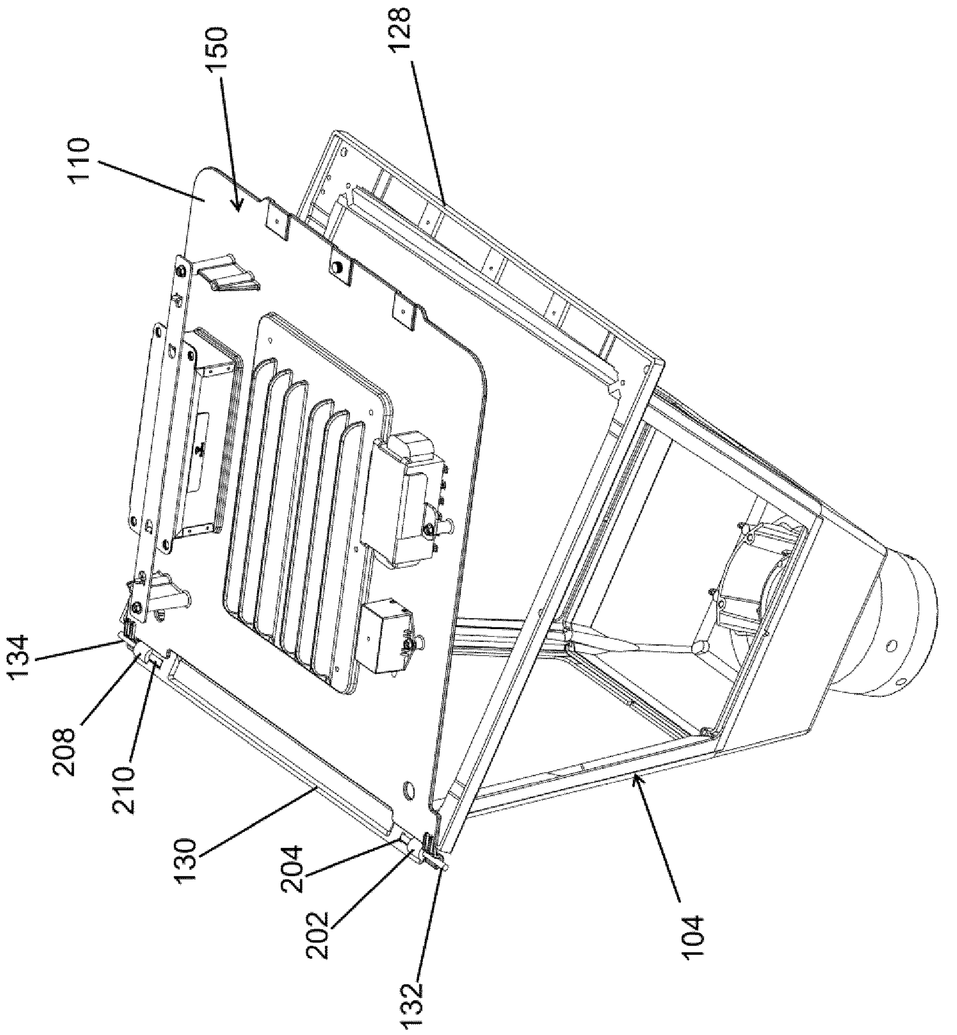
FIGS. 2A and 2B illustrate the top-post light fixture of FIGS. 1A-1C without the hood according to an example embodiment.
Figure 2B:
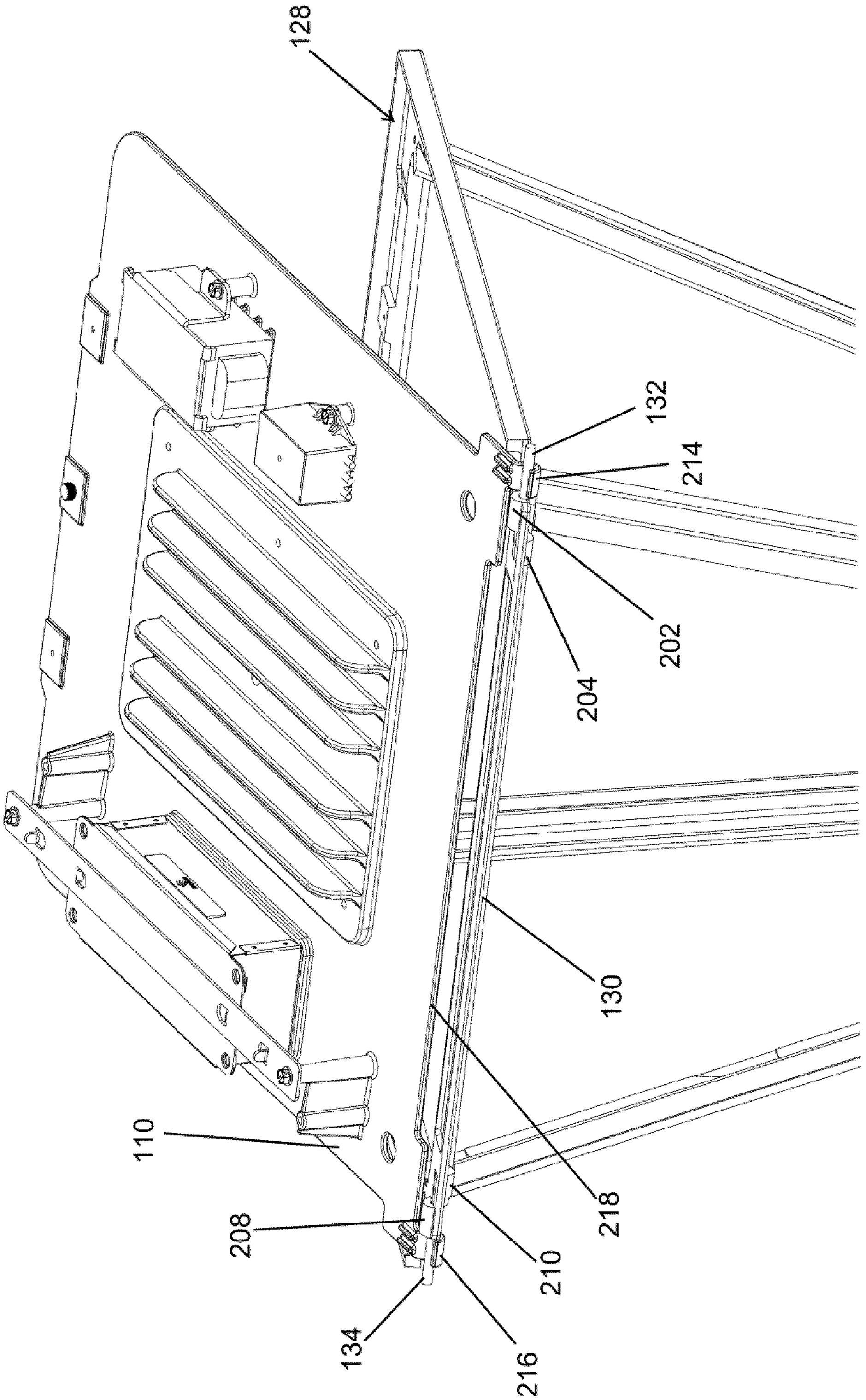

FIGS. 2A and 2B illustrate the top-post light fixture 100 of FIGS. 1A-1C without the hood 102 for clarity of illustration according to an example embodiment. Referring to FIGS. 1A-2B, in some example embodiments, the plate 110 is rotatably attached to the top frame 128 of the carriage 104 using the hinge pins 132 and 134. To illustrate, the carriage 104 includes attachment structures 202, 204 at one end portion of the attachment section 130 and attachment structures 208, 210 at another end portion of the attachment section 130.

In some example embodiments, the plate 110 includes attachment structures 214, 216 that extend out from a perimeter edge 218 of the plate 110. The hinge pin 132 may be positioned in slots of the attachment structures 202, 204 of the carriage 104 and in a slot of the attachment structure 214 of the plate 110. The hinge pin 134 may be positioned in slots of the attachment structures 208, 210 of the carriage 104 and in a slot of the attachment structure 216 of the plate 110. As more clearly shown in FIGS. 2A and 2B, the attachment structures 202 and 204 are adjacent to each other, and the attachment structures 208 and 210 are adjacent to each other. The attachment structure 214 of the plate 110 may be adjacent to the attachment structure 202 and the attachment structure 216 of the plate 110 may be adjacent to the attachment structure 208 such that the attachment structures 202, 204, 208, 210 and the attachment section 130 are between the attachment structures 214 and 216 as more clearly shown in FIG. 2B.

Figure 3A:
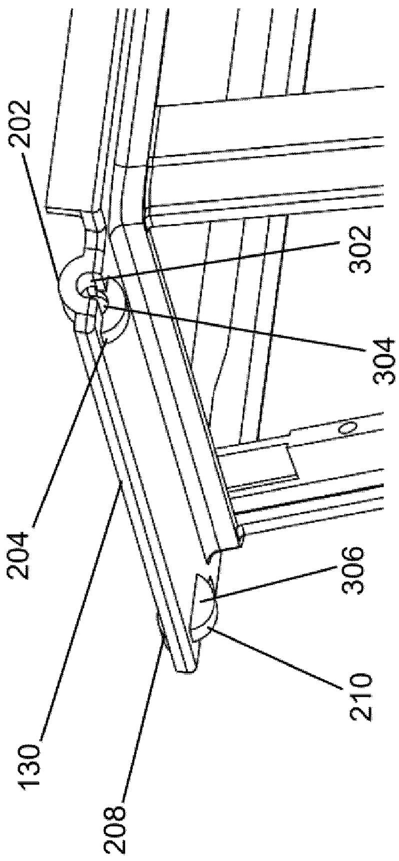
FIGS. 3A and 3B illustrate the attachment structures of the carriage of the top-post light fixture of FIGS. 1A-1C according to an example embodiment.
Figure 3B:
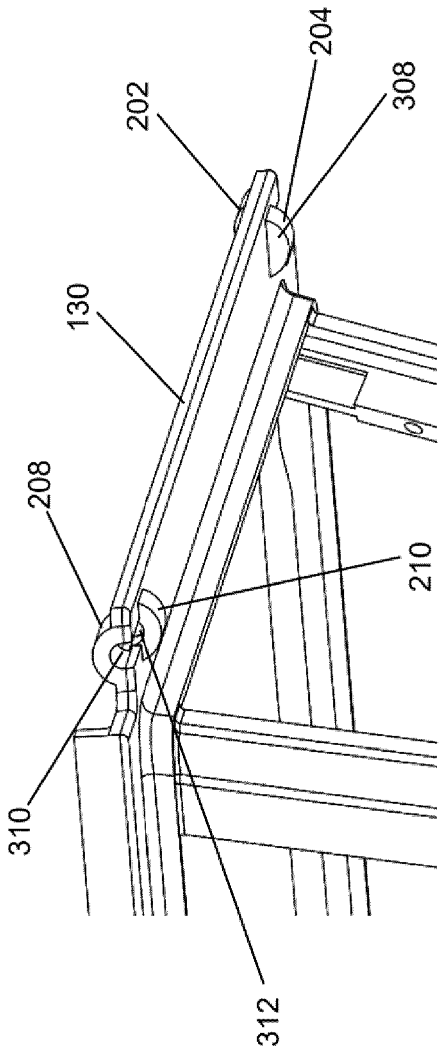

FIGS. 3A and 3B illustrate the attachment structures 202, 204, 208, 210 of the carriage 104 of the top-post light fixture 100 of FIGS. 1A-1C according to an example embodiment. In some example embodiments, the attachment structures 202, 204, 208, 210 may be formed in the attachment section 130 of the top frame 128. The attachment structure 202 may extend upward from the attachment section 130, and the attachment structure 204 may extend downward from the attachment section 130 such that the attachment structures 202 and 204 extend in opposite directions with respect to the top frame 128. The attachment structures 202, 204 may be curved such that the attachment structures 202, 204 each have a generally semi-circular (e.g., a u-shaped or upside-down u-shape) cross-section. The attachment structure 202 may include a slot 302 for receiving the hinge pin 132 and that extends entirely through the attachment structure 202. The attachment structure 204 may include a slot 304 for receiving the hinge pin 132. In contrast to the attachment structure 202, the attachment structure 204 may be closed at one end distal from the attachment structure 202 by a backing wall 308 that prevents the hinge pin 132 from moving beyond the attachment structure 204 when the hinge pin 132 is inserted in the slot 304.

In some example embodiments, the attachment structure 208 may extend upward from the attachment section 130, and the attachment structure 210 may extend downward from the attachment section 130 such that the attachment structures 208 and 210 extend in opposite directions with respect to the top frame 128. The attachment structures 208, 210 may be curved such that the attachment structures 208, 210 each have a generally semi-circular (e.g., a u-shaped or upside-down u-shape) cross-section. The attachment structure 208 may include a slot 310 for receiving the hinge pin 134 and that extends entirely through the attachment structure 208. The attachment structure 210 may include a slot 312 for receiving the hinge pin 134. In contrast to the attachment structure 208, the attachment structure 210 may be closed at one end distal from the attachment structure 208 by a backing wall 306 that prevents the hinge pin 134 from moving beyond the attachment structure 210 when the hinge pin 134 is inserted in the slot 312.

Referring to FIGS. 1A-3B, in some example embodiments, the attachment structure 202 of the carriage 104 has a slot opening that faces down while attachment structure 204 has a slot opening that faces up in the orientation of the carriage 104 shown on FIGS. 1A-3B. For example, the portion of the hinge pin 132 that is in the slot 302 of the attachment structure 202 may be visible from below the attachment structure 202, and the portion of the hinge pin 132 that is in the slot 304 may be visible from above the attachment structure 204 as can be more clean seen in FIG. 2A.

In some example embodiments, the attachment structure 208 may also have a slot opening that faces down while attachment structure 210 has a slot opening that faces up in the orientation of the carriage 104 shown on FIGS. 1A-3B. For example, the portion of the hinge pin 134 that is in the slot 310 of the attachment structure 208 may be visible from below the attachment structure 208, and the portion of the hinge pin 134 that is in the slot 312 may be visible from above the attachment structure 210 as can be more clean seen in FIG. 2A.

In some example embodiments, the plate 110 may be rotatable about the hinge pins 132, 134 between the position of the plate 110 shown in FIG. 1B and a position that is at least 180 degrees from the position of the plate 110 shown in FIG. 1B. To illustrate, a portion of the hinge pin 132 may be positioned in the slot of the attachment structure 214, and a portion of the hinge pin 134 may be positioned in the slot of the attachment structure 216 as shown in FIGS. 2A and 2B.

Figure 4:
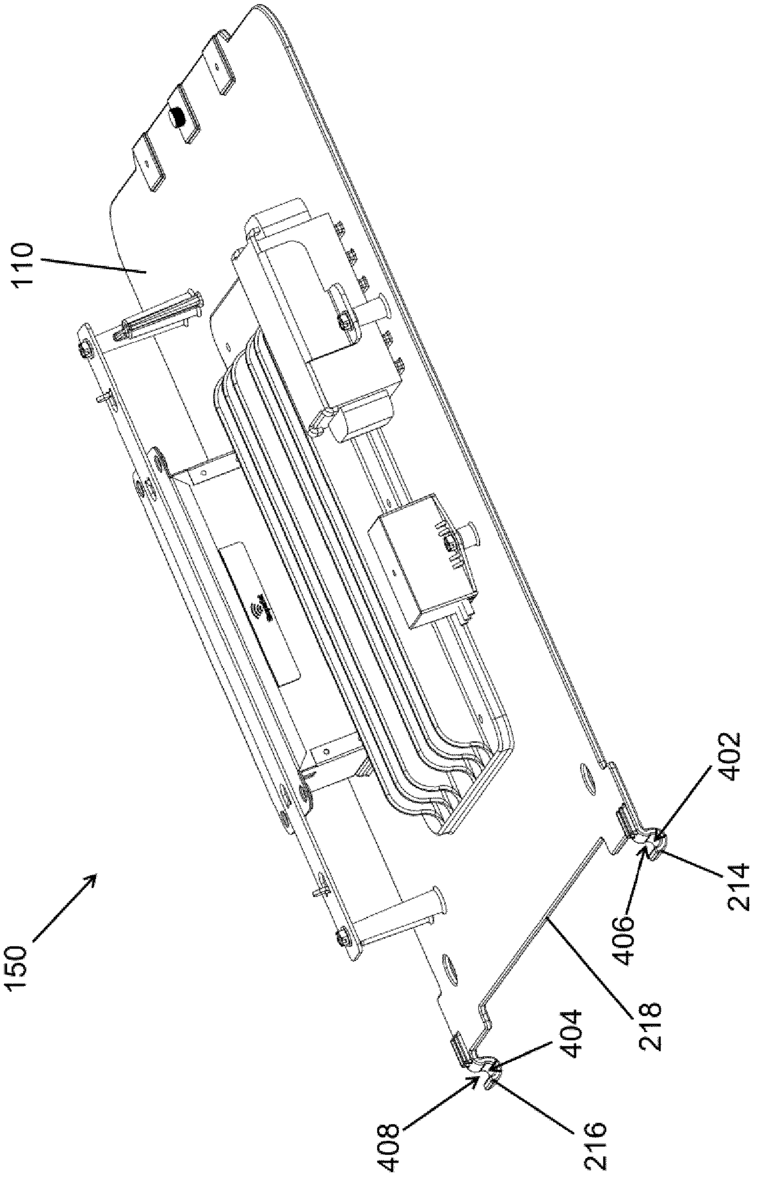
FIG. 4 illustrates the light engine of the top-post light fixture of FIGS. 1A-1C according to an example embodiment.

FIG. 4 illustrates the light engine 150 of the top-post light fixture of FIGS. 1A-1C according to an example embodiment. The light engine 150 includes the plate 110, and the attachment structures 214, 216 extend out from the perimeter edge 218 of the plate 110. The attachment structure 214 may have a slot 402 for receiving a portion of the hinge pin 132 as shown in FIGS. 2A and 2B. The attachment structure 216 may have a slot 404 for receiving a portion of the hinge pin 134 as shown in FIGS. 2A and 2B. The attachment structures 214 and 216 may each have a u-shaped cross-section having a slot opening 406 and 408 (i.e., top opening on the u-shape), respectively.

Referring to FIGS. 1A-4, the attachment structures 214, 216 enable the plate 110 to be rotatable about the hinge pins 132, 134. The shape of the attachment structures 214, 216 enables the plate 110 to be removed/detached from the carriage 104 and the hinge pins 132, 134 without first pulling out the hinge pins 132, 134 from the slots of the attachment structures 202, 204, 208, 210 of the carriage 104. To illustrate, the plate 110 may be rotated to a position that allows the plate 110 to be pushed/pulled up, vertically or at a non-vertical angle such that the hinge pin 132 is out of the slot 402 through the slot opening 406 and such that the hinge pin 134 is out of the slot 404 through the slot opening 408. In general, the shape of the attachment structures 214, 216 enable the plate 110 to be rotated to a position that allows the plate 110 (i.e., the light engine 150 that includes the plate 110) to be removed/detached from the carriage 104 and the hinge pins 132, 134 without first detaching the hood 102 and the hinges 132, 134 from the carriage 104. The shape of the attachment structures 214, 216 also allow a person (e.g., a lineman) to attach back the light engine 150 or a replacement light engine that includes the plate 110 to the hinges 132, 134 without first detaching the hood 102 and the hinges 132, 134 from the carriage 104.

In some alternative embodiments, the attachment structures 202, 204, 208, 210, 214, 216 may have a different shape than shown without departing from the scope of this disclosure. In some alternative embodiments, the attachment structures 202, 204, 208, 210, 214, 216 may be at different locations than shown without departing from the scope of this disclosure. In some alternative embodiments, the light fixture 100 may include fewer or more attachment structures than shown without departing from the scope of this disclosure. For example, the plate 110 may include a single attachment structure or more than two attachment structures. As another example, the carriage 104 may include a single or three or more attachment structure at each end portion of the attachment section 130 without departing from the scope of this disclosure.

Figure 5:
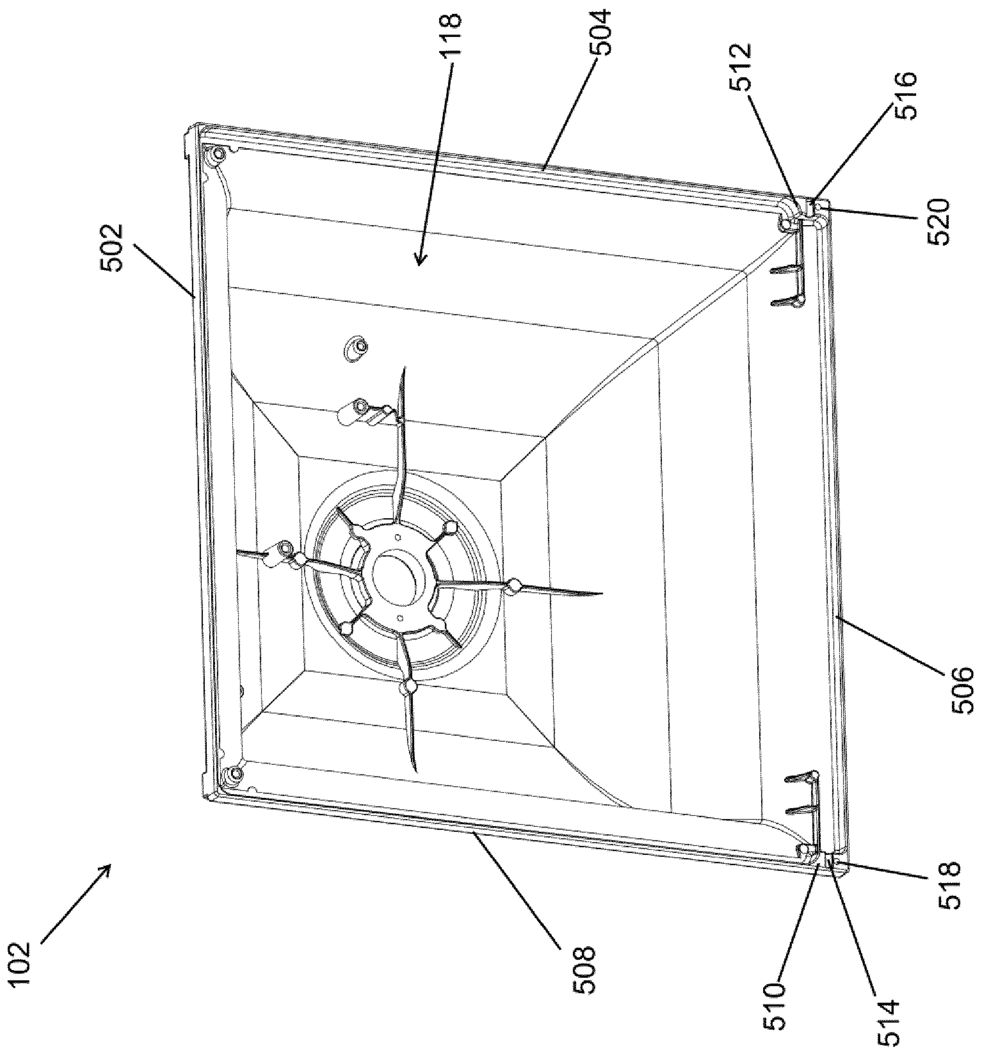
FIG. 5 illustrates the hood of the top-post light fixture of FIGS. 1A-1C according to an example embodiment.
Figure 6B:
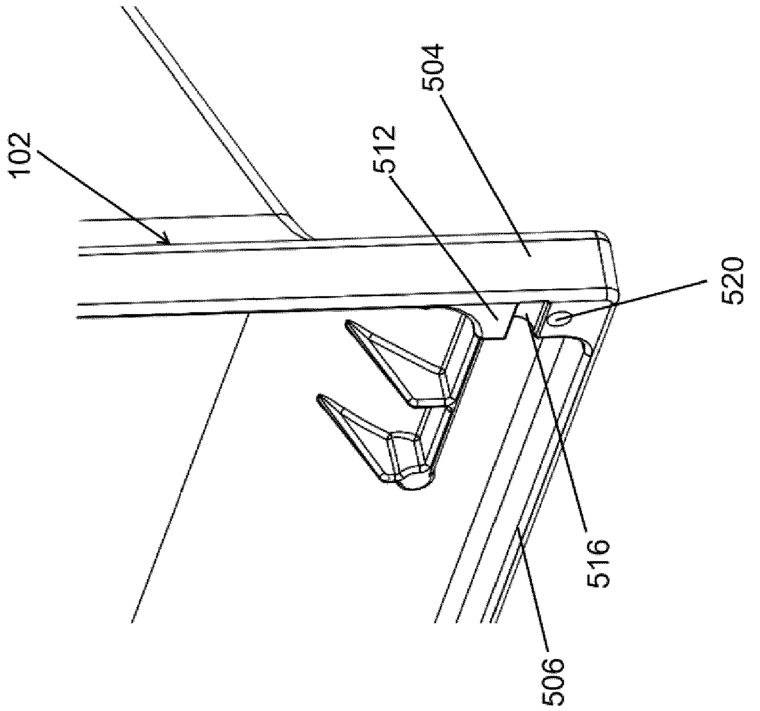
FIGS. 6A and 6B illustrate close-up views of the attachment structures of the hood shown in FIG. 5 according to an example embodiment.
Figure 6A:
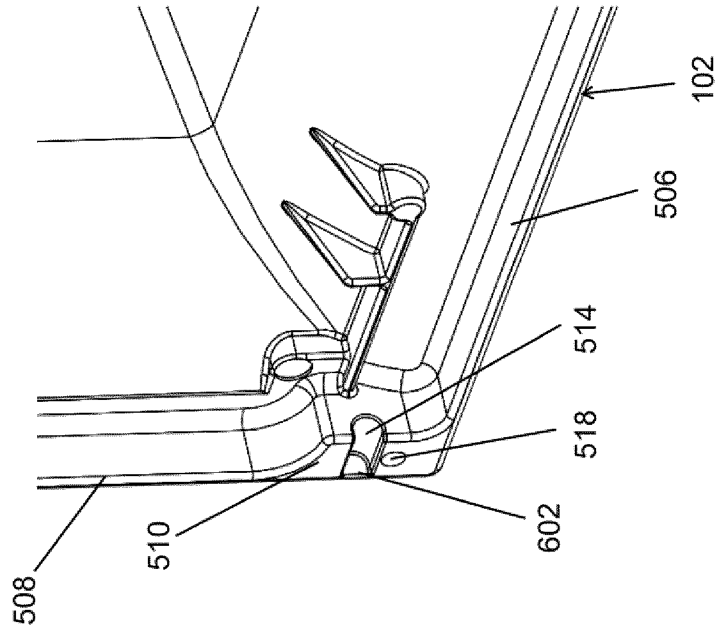

FIG. 5 illustrates the hood 102 of the top-post light fixture 100 of FIGS. 1A-1C according to an example embodiment, and FIGS. 6A and 6B illustrate close-up views of the attachment structures 510, 512 of the hood 102 shown in FIG. 5 according to an example embodiment. Referring to FIGS. 1A-6B, in some example embodiments, the hood 102 includes the attachment structure 510 at or near one corner of the hood 102 and the attachment structure 512 at or near another corner of the hood 102. To illustrate, the hood 102 may include perimeter walls 502, 504, 506, 508. For example, the perimeter walls 502, 504, 506, 508 may be positioned on or around the top frame 128 of the carriage 104 when the hood 102 is closed over the carriage 104 as shown in FIG. 1A. The attachment structure 510 may be located at or near the corner of the perimeter walls 506 and 508, and the attachment structure 512 may be located at or near the corner of the perimeter walls 506 and 504. In some example embodiments, the attachment structures 510, 512 may be formed as part of one or more of the perimeter walls of the hood 102.

In some example embodiments, the attachment structure 510 may include a slot 514 for receiving an end portion of the hinge pin 132, and the attachment structure 512 may include a slot 516 for receiving an end portion of the hinge pin 134. A backing wall 602 at an end of the slot 514 prevents the movement of the hinge pin 132 beyond the slot 514 when the hinge pin 132 is inserted in the slot 514. For example, the backing wall 602 may be part of the perimeter wall 508 of the hood 102. A backing wall similar to the backing wall 602 may prevent the movement of the hinge pin 134 beyond the slot 516 when the hinge pin 134 is inserted in the slot 516.

Figure 7:
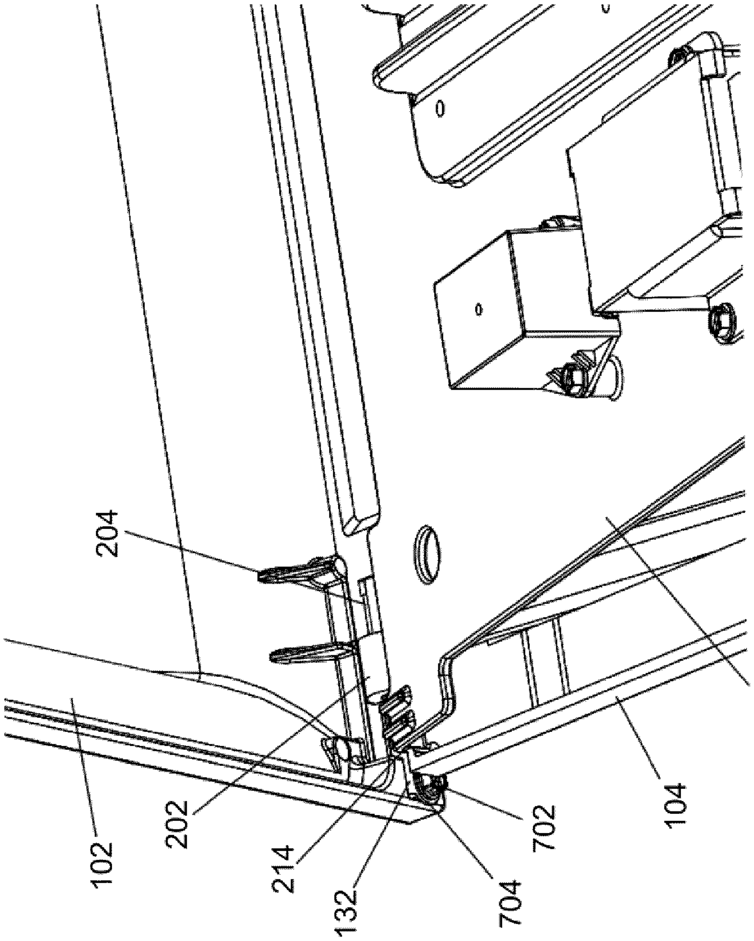
FIG. 7 illustrates a portion of the top-post light fixture of FIGS. 1A-1C where the hood and the plate are rotatably attached to the carriage according to an example embodiment.
Figure 8:
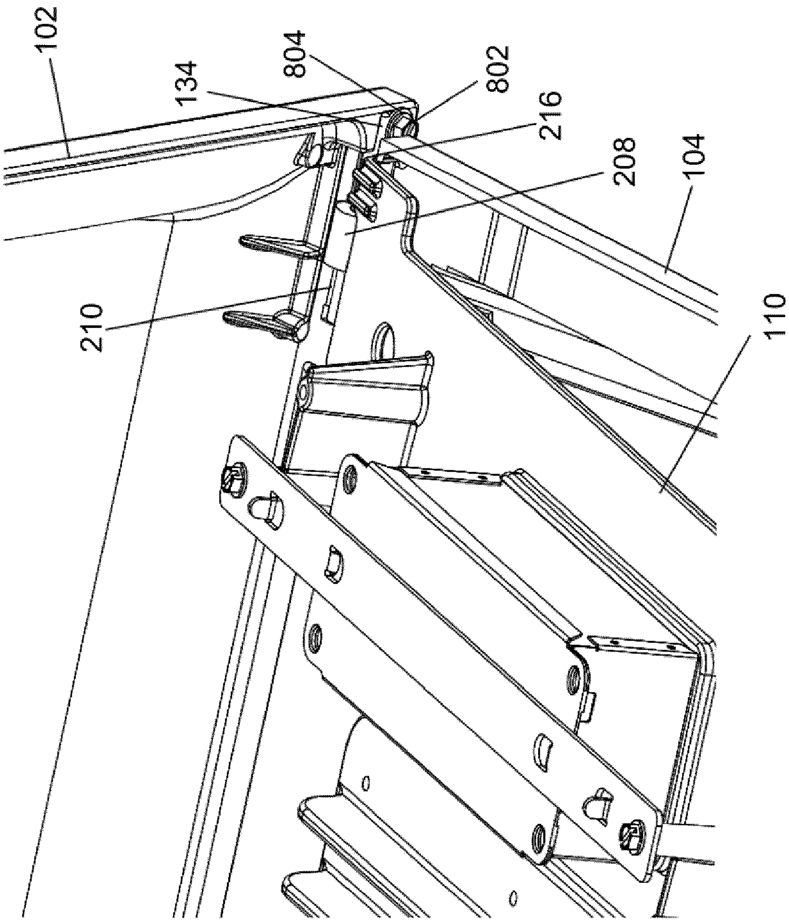
FIG. 8 illustrates another portion of the top-post light fixture of FIGS. 1A-1C where the hood and the plate are rotatably attached to the carriage according to an example embodiment.

In some example embodiments, the attachment structure 510 may include a hole 518 for inserting a screw that retains the hinge pin 132 in the slot 514 as shown in FIG. 7, and the attachment structure 512 may include a hole 520 for inserting a screw that retains the hinge pin 134 in the slot 516 as shown in FIG. 8. FIG. 7 illustrates a portion of the top-post light fixture 100 of FIGS. 1A-1C where the hood 102 and the plate 110 are rotatably attached to the carriage 104 according to an example embodiment, and FIG. 8 illustrates another portion of the top-post light fixture 100 of FIGS. 1A-1C where the hood 102 and the plate 110 are rotatably attached to the carriage 104 according to an example embodiment. Referring to FIGS. 1A-8, as described above, the hood 102 and the plate 110 are rotatably attached to the carriage 104 using the hinge pins 132, 134.

As more clearly shown in FIG. 7, the hinge pin 132 is inserted in the slots 302 of the attachment structure 202 of the carriage 104, the slot 304 of the attachment structure 204 of the carriage 104, the slot 402 of the attachment structure 214 of the plate 110, and the slot 514 of the attachment structure 510 of the hood 102. One end portion of the hinge pin 132 is positioned in the slot 304 of the attachment structure 204, and an opposite end portion of the hinge pin 132 is positioned in the slot 514 of the attachment structure 510 of the hood 102.

As more clearly shown in FIG. 8, the hinge pin 134 is inserted in the slots 310 of the attachment structure 208 of the carriage 104, the slot 312 of the attachment structure 210 of the carriage 104, the slot 404 of the attachment structure 216 of the plate 110, and the slot 516 of the attachment structure 512 of the hood 102. One end portion of the hinge pin 134 is positioned in the slot 312 of the attachment structure 210, and an opposite end portion of the hinge pin 134 is positioned in the slot 516 of the attachment structure 512 of the hood 102.

In some example embodiments, a screw 702 that is inserted in the hole 518 may retain the hinge pin 132 in the slot 514 of the attachment structure 510 such that the hood 102 is rotatably attached to the carriage 104 by the hinge pin 132 as more clearly shown in FIG. 7. For example, the head of the screw 702 may be in contact with the hinge pin 132 and may retain the hinge pin 132 in the slot 514. In some alternative embodiments, a washer 704 may be attached the screw 702 such that the washer 704, instead of the screw 702, comes in contact with the hinge pin 132.

In some example embodiments, a screw 802 that is inserted in the hole 520 may retain the hinge pin 134 in the slot 516 of the attachment structure 512 such that the hood 102 is rotatably attached to the carriage 104 by the hinge pin 134 as more clearly shown in FIG. 8. For example, the head of the screw 802 may be in contact with the hinge pin 134 and may retain the hinge pin 134 in the slot 516. In some alternative embodiments, a washer 804 may be attached the screw 802 such that the washer 804, instead of the screw 802, comes in contact with the hinge pin 134.

In some example embodiments, the hood 102 may be detached/removed from the carriage 104 by loosening and/or removing the screws 702 and 802 such that the hood 102 can be moved to remove the hinge pins 132 and 134 from the slots 514 and 516, respectively. In some example embodiments, after the removal of the hood 102, the plate 110 can be removed/detached from the carriage 104 after pulling the hinge pins 132, 134 out from the slots of the attachment structures of the carriage 104 and the slots of the attachment structures of the plate 110. Alternatively, the plate 110 may be removed/detached from the carriage 104 without first removing the hinge pins 132, 134. To illustrate, after removing the hood 102 as described above, the plate 110 may be rotated to a position that is, for example, more than 90 degrees from the position of the plate 110 shown in FIG. 1B and subsequently pulled up, vertically or at another angle, such that the hinge pins 132 and 134 move out of the slots 402 and 404 of the plate 110 through the slot openings 406 and 408, respectively. In some example embodiments, the plate 110 may be rotated to a position that allows the plate 110 to be pulled up, vertically or at another angle, to remove the hinge pins 132 and 134 from the slots 402 and 404 through the slot openings 406 and 408, respectively, without first removing the hood 102 from the carriage 104.

In some alternative embodiments, means other than the screws 702, 802 may be used to retain the hinge pins 132, 134 in the slots of the attachment structures of the hood 102 without departing from the scope of this disclosure. In some alternative embodiments, the attachment structures of the hood 102 may have a different shape and/or different features than shown without departing from the scope of this disclosure. In some alternative embodiments, the hinge pins 132, 134 may have a different shape than shown without departing from the scope of this disclosure.

Figure 9A:
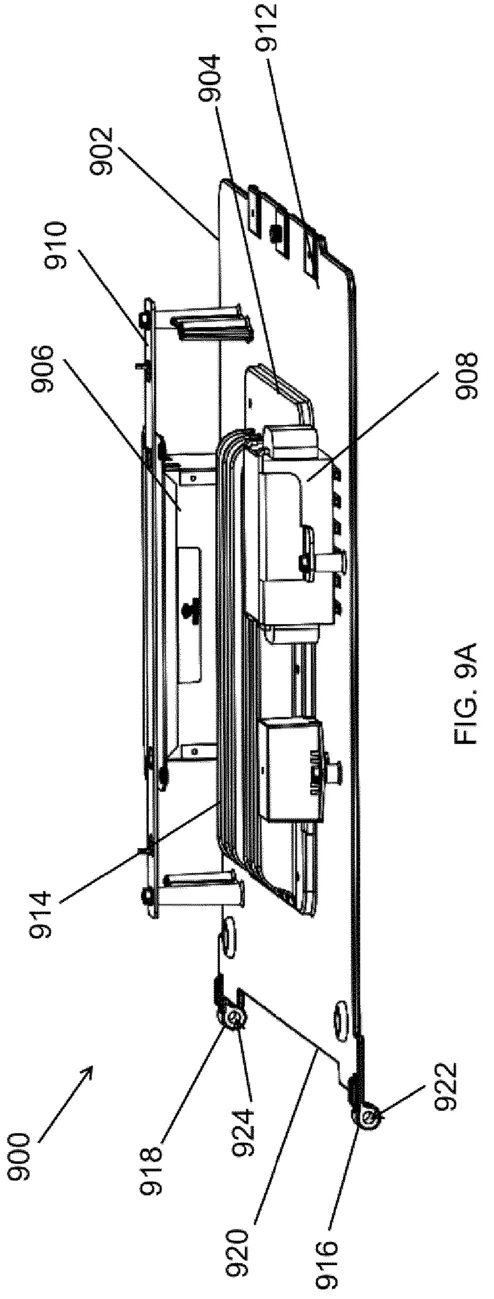
FIGS. 9A and 9B illustrate a light engine that can be used in the top-post light fixture of FIGS. 1A-1C according to another example embodiment.
Figure 9B:
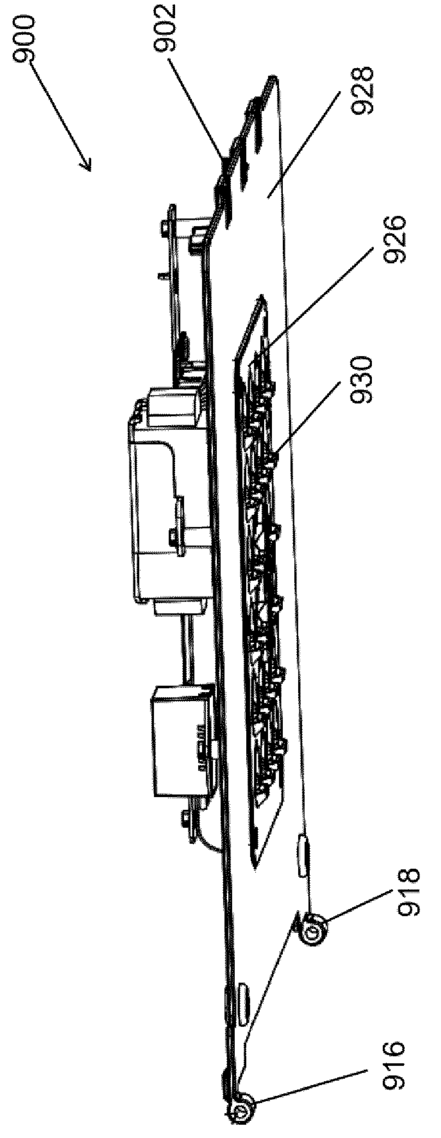

FIGS. 9A and 9B illustrate a light engine 900 that can be used in the top-post light fixture 100 of FIGS. 1A-1C according to another example embodiment. In some example embodiments, the light engine 900 may include a plate 902 that has a recess section 904. For example, the recess section 904 may be similar to the recess section 136 described with respect to FIGS. 1A-1C. To illustrate, the light engine 900 may include a light module 926 that is similar to or the same type as the light module 112 described with respect to FIGS. 1A-1C. For example, the light module 926 may include light sources 930 (e.g., LED light sources) and may be positioned recessed in the recess section 904 such that the light module 926 emits light toward the cavity 116 of the carriage 104 when the light engine 900 is used in the light fixture 100. The light module 926 may be recessed such that the light module 926 is flush with a surface 928 of the portion of the plate 902 surrounding the recess section 136. The plate 902 may include fins 914 that operate in a similar manner as the fins 138 of the plate 110 shown in FIG. 1C to dissipate heat away from the light module 926.

In some example embodiments, the light engine 900 also includes a driver 906 (e.g., an LED driver) that is secured to the plate 902 using a bracket 910 and fasteners as can be readily understood by those of ordinary skill in the art with the benefit of the scope of this disclosure. The light engine 900 may also include other components such as a surge suppressor 908 disposed on a surface 912 of the plate 902.

In some example embodiments, attachment structures 916, 918 extend out from a perimeter edge 920 of the plate 902. For example, the attachment structures 916, 918 extend out from the plate 902 at opposite ends of the perimeter edge 920. Alternatively, the attachment structures 916, 918 may extend out from the plate 902 at different locations than shown without departing from the scope of this disclosure. In some example embodiments, the attachment structures 916, 918 may have a cylindrical shape and may include a respective slot 922, 924 for receiving a hinge pin. To illustrate, the attachment structure 916 may include the slot 922 that extends through the attachment structure 916, and the attachment structure 918 may include the slot 924 that extends through the attachment structure 918. In contrast to the attachment structures 214, 216 of the plate 110 shown in FIG. 4, the slots 922, 924 of the attachment structures 916, 918 of the plate 902 each form a closed loop.

In some example embodiments, the plate 902 may be made from a suitable material such as aluminum as can be readily understood by those of ordinary skill in the art with the benefit of the scope of this disclosure. For example, the plate 902 may be made using methods such as die casting. In some alternative embodiments, the plate 902 may be made from one or more materials sheet metal using methods such as stamping, cutting, drilling, etc. as can be readily understood by those of ordinary skill in the art with the benefit of the scope of this disclosure.

In some alternative embodiments, the attachment structures 916, 918 may have a different shape than shown without departing from the scope of this disclosure. In some alternative embodiments, one or more components of the light engine 900 may be omitted without departing from the scope of this disclosure.

Figure 10B:
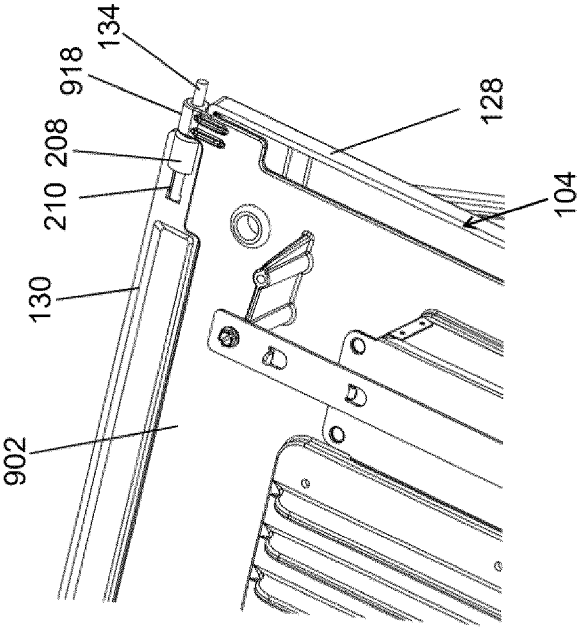
FIGS. 10A and 10B illustrate the light engine of FIGS. 9A and 9B attached to the carriage of the top-post light fixture of FIGS. 1A-1C according to another example embodiment.
Figure 10A:
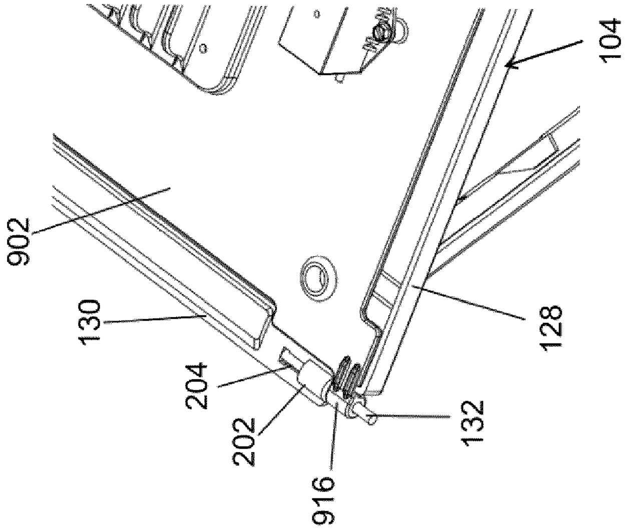

FIGS. 10A and 10B illustrate the light engine 900 of FIGS. 9A and 9B attached to the carriage 104 of the top-post light fixture 100 of FIGS. 1A-1C according to another example embodiment. Referring to FIGS. 1A-3B and 5-6B, 9A-10B, in some example embodiments, the plate 902 of the light engine 900 may be rotatably attached to the carriage 104 using the hinge pins 132, 134 in a similar manner as described with respect to the plate 110. To illustrate, the hinge pin 132 may be positioned in the slot 302 of the attachment structure 202 of the carriage 104, the slot 304 of the attachment structure 204 of the carriage 104, the slot 922 of the attachment structure 916 of the plate 902, and the slot 514 of the attachment structure 510 of the hood 102. Similarly, the hinge pin 134 may be positioned in the slot 310 of the attachment structure 208 of the carriage 104, the slot 312 of the attachment structure 210 of the carriage 104, the slot 924 of the attachment structure 918 of the plate 902, and the slot 516 of the attachment structure 512 of the hood 102. As described above, the attachment structures 202, 204, 208, 210 may be formed in the attachment section 130 of the top frame 128 of the carriage 104.

In some example embodiments, the plate 902 may be rotated between the position shown in FIGS. 10A and 10B and other positions up to, for example, 180 degrees or more from the position shown in FIGS. 10A and 10B. In contrast to the plate 110 shown in FIG. 4, the plate 902 is removable/detachable from the carriage 104 by first removing the hinge pins 132, 134 from the attachment structures 916, 918 of the plate 902. The plate 902 is also removable/detachable from the carriage 104 after removing the hood 102, which requires the removal of the fasteners 702, 802 shown in FIGS. 7 and 8.

By using the rotatable plate 902, the light fixture 100 can provide an easy access to the cavity 116 of the carriage 104 through the opening 148 without requiring the removal of screws. The rotatability of the plate 902 also enables the maintenance, repair, and replacement of the light module 926 of the light engine 900 without requiring the removal of screws to access the light module 926.

In some alternative embodiments, the light engine 900 may include more or fewer components than shown without departing from the scope of this disclosure. For example, the driver 906 may be omitted or may be separate from the light engine 900 without departing from the scope of this disclosure. In some alternative embodiments, the hood 102 and the plate 902 may be rotatably attached to the carriage 104 in a different manner than shown without departing from the scope of this disclosure.

Figure 11:
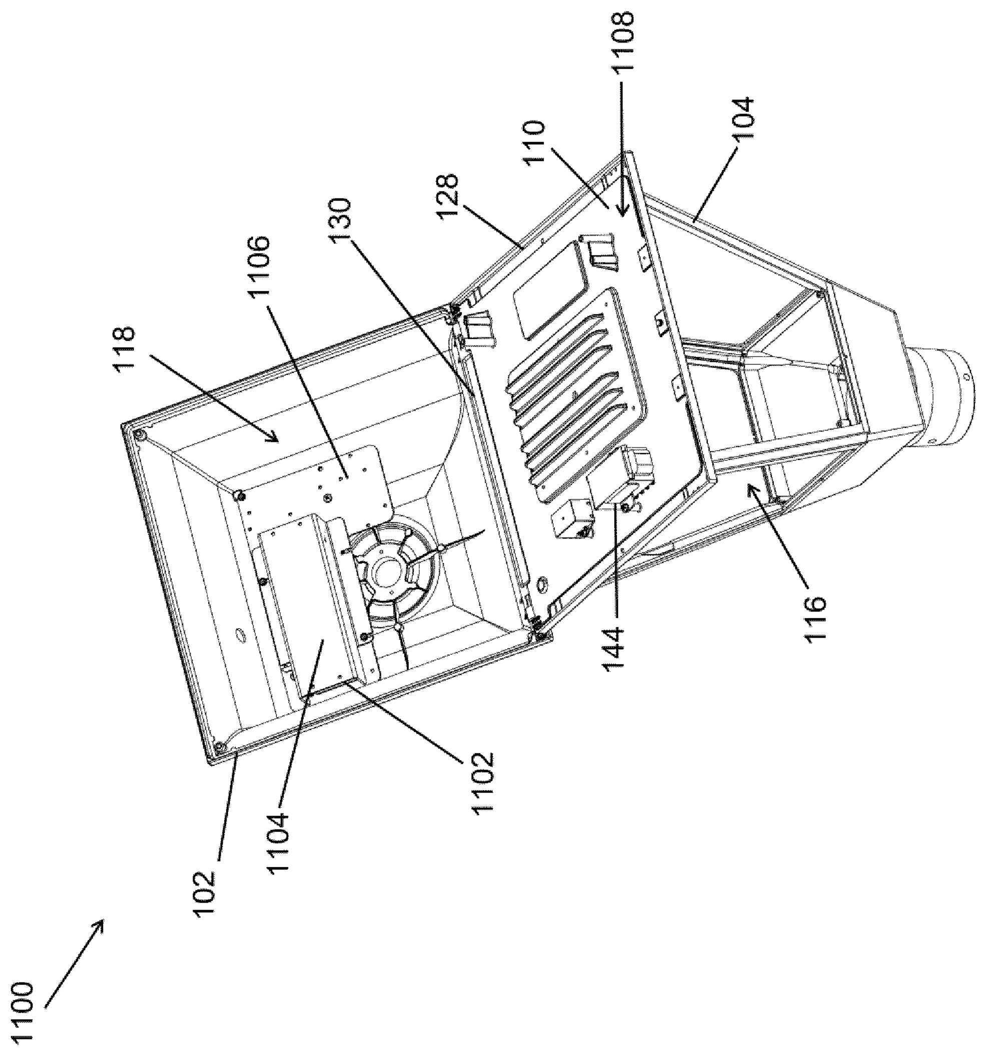
FIG. 11 illustrates a top-post light fixture according to another example embodiment.

FIG. 11 illustrates a top-post light fixture 1100 according to another example embodiment. In some example embodiments, the light fixture 1100 includes the hood 102, the carriage 104, and a light engine 1108. The light engine 1108 may correspond to the light engine 150 of the light fixture 100 of FIGS. 1A-1C except that the light engine 1108 of the light fixture 1100 does not include the driver 140. To illustrate, the light engine 1108 may include plate 110, the light module 112, and other components, such as the transformer 144, of the light engine 150. The hood 102 and the plate 110 may be rotatably attached to the carriage 104 using hinge pins, and the plate 110 may be rotated to different positions as described above with respect to the light fixture 100.

In contrast to the light fixture 100 of FIGS. 1A-1C, the light fixture 1100 may include a driver 1102 that is positioned in the cavity 118 of the hood 102. For example, the driver 1102 may be secured to a driver plate 1106 by a bracket 1104. The bracket 1104 may be attached to the driver plate 1106 using fasteners, and the driver plate 1106 may be attached to the hood using the same and/or other fasteners as can be readily understood by those of ordinary skill in the art with the benefit of the scope of this disclosure. The driver 1102 may provide power to the light module of the light engine 1108 via electrical connections as can be readily understood by those of ordinary skill in the art with the benefit of the scope of this disclosure.

By using the rotatable plate 110, the light fixture 1100 can provide an easy access to the cavity 116 of the carriage 104 through the opening 148 (shown in FIG. 1C) of the carriage 104 without requiring the removal of screws. The rotatability of the plate 110 also enables the maintenance, repair, and replacement of the light module of the light engine 1108 without requiring the removal of screws to access the light module. Because the rotatability of the plate 110 enables the removal of the plate 110 from the carriage 104 without first removing the hood 102 and/or the hinge pins, the light fixture 1100 simplifies the process of replacing the light engine 1108.

In some alternative embodiments, the light engine 1108 may include the plate 900 of FIGS. 9A and 9B instead of the plate 110 without departing from the scope of this disclosure. In some alternative embodiments, the driver 1102 may be at a different location in the cavity 118 of the hood 102 than shown without departing from the scope of this disclosure.

Figure 12A:
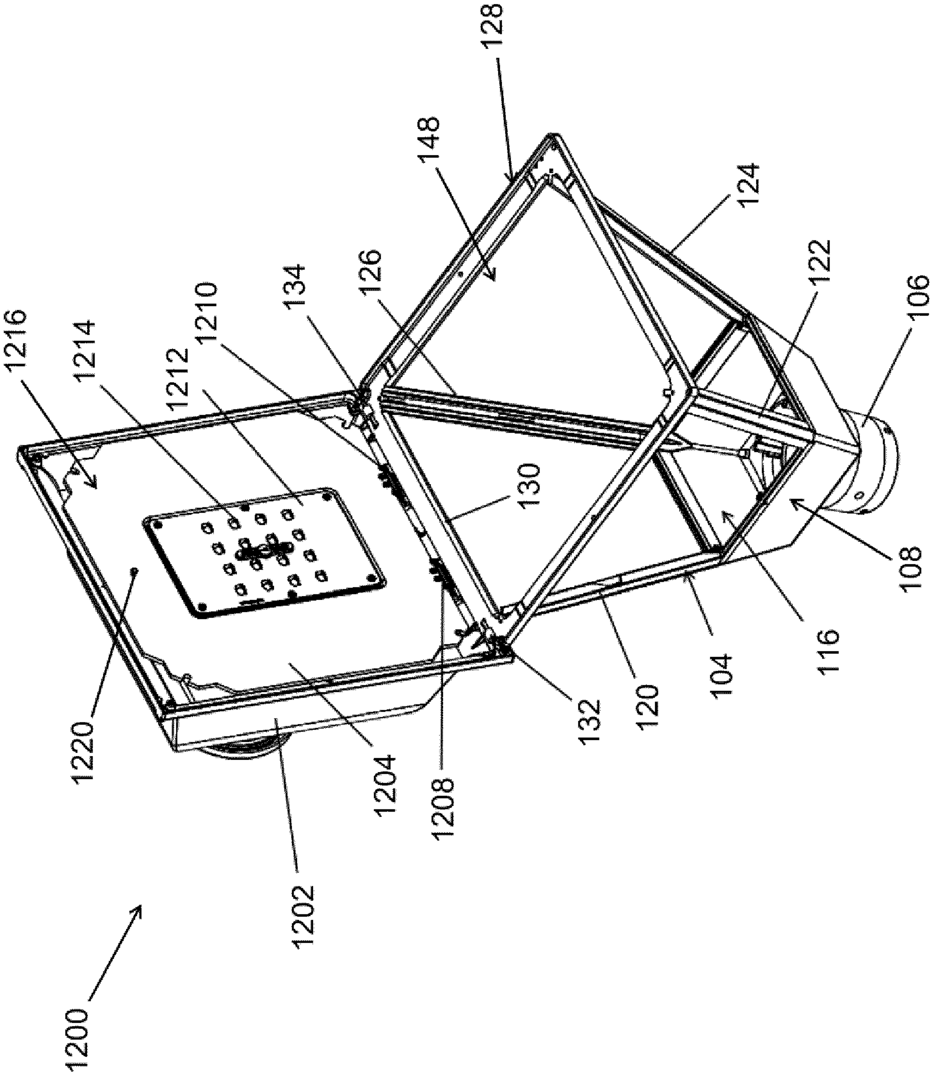
FIGS. 12A and 12B illustrate a top-post light fixture according to another example embodiment.
Figure 12B:
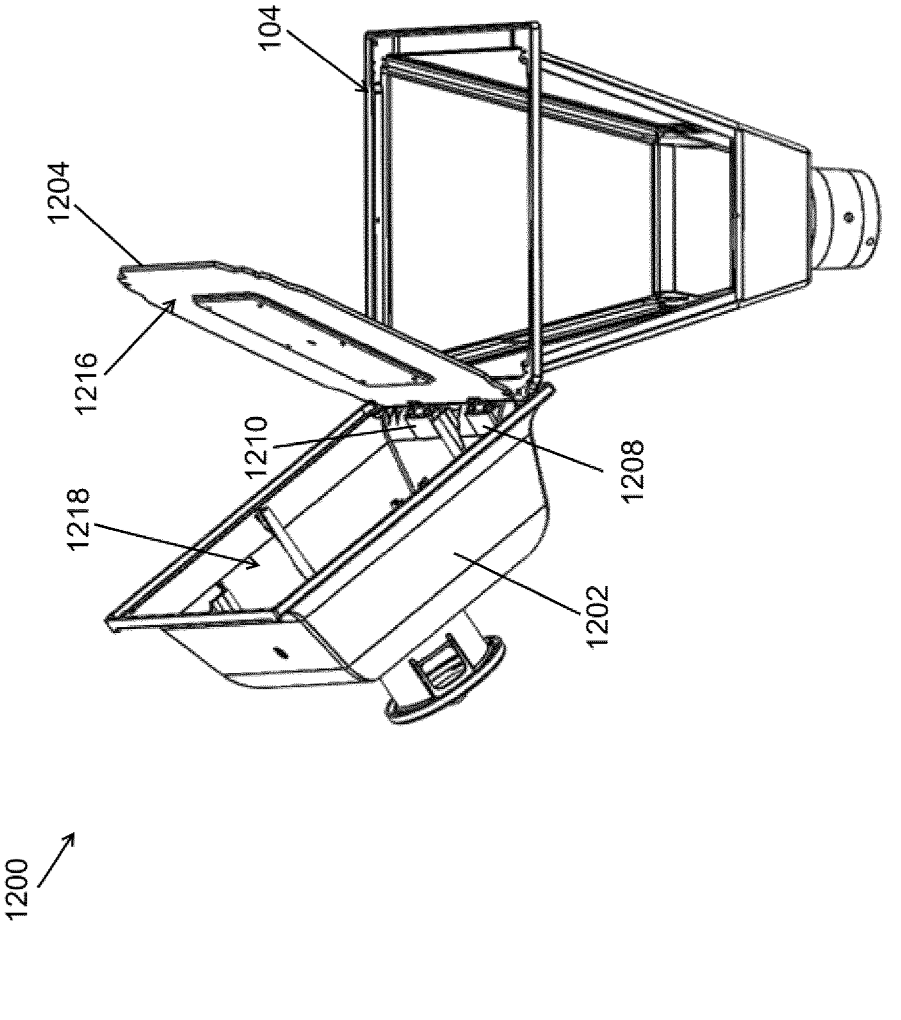

FIGS. 12A and 12B illustrate a top-post light fixture 1200 according to another example embodiment. In some example embodiments, the light fixture 1200 includes a hood 1202, the carriage 104, and a light engine 1216 that includes a plate 1204. The plate 1204 of the light engine 1216 may be rotatably attached to the hood 1202 using mounting structures 1208, 1210 and hinge pins as described below in more detail. The hood 1202 may be rotatably attached to the carriage 104 using the hinge pins 132, 134.

In some example embodiments, the hood 1202 may be rotatably attached to the carriage 104 using the hinge pins 132, 134, for example, in a similar manner as described with respect to the hood 102 of the light fixture 100 shown in FIGS. 1A-1C. For example, the hood 1202 may be rotated to various positions such as those shown in FIGS. 12A and 12B as well as other positions. As another example, the hood 1202 may be closed over the carriage 104 in a similar manner as shown with respect to the hood 102 of the light fixture 100 in FIG. 1A.

In some example embodiments, the carriage 104 may include the post attachment section 106, the base 108, and the top frame 128 that includes the attachment section 130. The base 108 may be attached to the post attachment section 106, and the post attachment section 106 may be used to attach the top-post light fixture 100 to a post (not shown) as can be readily understood by those of ordinary skill in the art. The carriage 104 may also include the arms 120, 122, 124, 126 that are connected to and extend between the base 108 and the top frame 128. The base 108, the arms 120, 122, 124, 126, and the top frame 128 may define the cavity 116 of the carriage 104. An opening 148 of the carriage 104 may be bounded by the top frame 128 and may be used to access the cavity 116 of the carriage 104 from above the carriage 104. For example, lenses (not shown) may be inserted into the cavity 116 of the carriage 104 through the opening 148 and may be positioned between adjacent ones of the arms 120, 122, 124, 126 as can be readily understood by those of ordinary skill in the art.

In some example embodiments, the light engine 1216 may also include a light module 1212 that is attached to the plate 1204. The light module 1212 may include light sources 1214, such as light emitting diode (LED) light sources, positioned to emit light toward the cavity 116 of the carriage 104 when the hood 1202 is closed over the carriage 104 in a similar manner as shown in FIG. 1A with respect to the hood 102 of the light fixture 100.

In some example embodiments, the plate 1204 of the light engine 1216 may be rotated to various positions while attached to the hood 1202 by the mounting structures 1208, 1210 and hinge pins. For example, the plate 1204 may be rotated to the position shown in FIG. 12A or another position such as the position shown in FIG. 12B. As another example, the plate 1204 may be rotated to a position where the plate 1204 rests on the top frame 128 of the carriage 104 while the hood 1202 remains open, for example, in the position shown in FIG. 12A.

In some example embodiments, the plate 1204 may be rotated to a position, such as the position shown in FIG. 12B, to gain access to the cavity 1218 of the hood 1202. For example, a driver of the light fixture 1200 may be positioned in the cavity 1218 of the hood 1202 in a similar as described with the light fixture 1100. For example, electrical wires (not shown) may be routed between a driver that is in the cavity 1218 and the light module 1212 of the light engine 1216 as can be readily understood by those of ordinary skill in the art with the benefit of the scope of this disclosure. In some example embodiments, other components (e.g., a surge suppressor) may also be placed in the cavity 1218 of the hood 1202.

In some example embodiments, the plate 1204 may be rotated along with the hood 1202. For example, the plate 1204 may be held in a fixed position with respect to the hood 1202, for example, as shown in FIG. 12A, and rotated along the hood 1202. To illustrate, the plate 1204 may be secured to the hood 1202 using a thumb screw 1220 (shown in FIG. 12A) to prevent the plate 1204 from rotating independent of the hood 1202. Alternatively or in addition, a person (e.g., a lineman) may hold the plate 1204 in place while rotating the hood 1202.

In some example embodiments, the hood 1202 and the carriage 104 may be made from a suitable material (e.g., aluminum, etc.) using methods, such as die casting, as can be readily understood by those of ordinary skill in the art with the benefit of this disclosure. In some example embodiments, the plate 1204 may be made from one or more materials such as sheet metal using methods such as stamping, cutting, drilling, etc. as can be readily understood by those of ordinary skill in the art with the benefit of the scope of this disclosure. In some alternative embodiments, the plate 1204 may be made using a die casting method as can be readily understood by those of ordinary skill in the art with the benefit of the scope of this disclosure.

By using the rotatable plate 1204 that is attached to the hood 1202, the light fixture 1200 can provide an easy access to the cavity 116 of the carriage 104 through the opening 148 of the carriage 104 without requiring the removal of screws. The rotatability of the plate 1204 also enables the maintenance and repair of the light module 1212 of the light engine 1216 without requiring the removal of screws to access the light module 1212. The attachment of the plate 1204 to the hood 1202 also enables the light engine 1216 including the plate 1204 to be removed from the carriage 104 as a unit by just removing/detaching the hood 1202 from the carriage 104. The attachment of the plate 1204 to the hood 1202 also enables the light engine 1216 including the plate 1204 to be removed from the hood 1202 and replaced by another light engine without requiring the removal of the hood 1202.

In some alternative embodiments, some of the components of the light fixture 1200 may be omitted without departing from the scope of this disclosure. In some alternative embodiments, some components of the light fixture 100 may have different shapes than shown without departing from the scope of this disclosure. For example, the light module 1212 may have a non-rectangular shape. In some alternative embodiments, the light engine 1216 may include more or fewer components than shown without departing from the scope of this disclosure. For example, the light engine 1216 may include a driver without departing from the scope of this disclosure. In some alternative embodiments, the hood 1202 may be rotatably attached to the carriage 104 in a different manner than shown without departing from the scope of this disclosure. In some alternative embodiments, the plate 1204 may be rotatably attached to the hood 1202 in a different manner than shown without departing from the scope of this disclosure.

Figure 13:
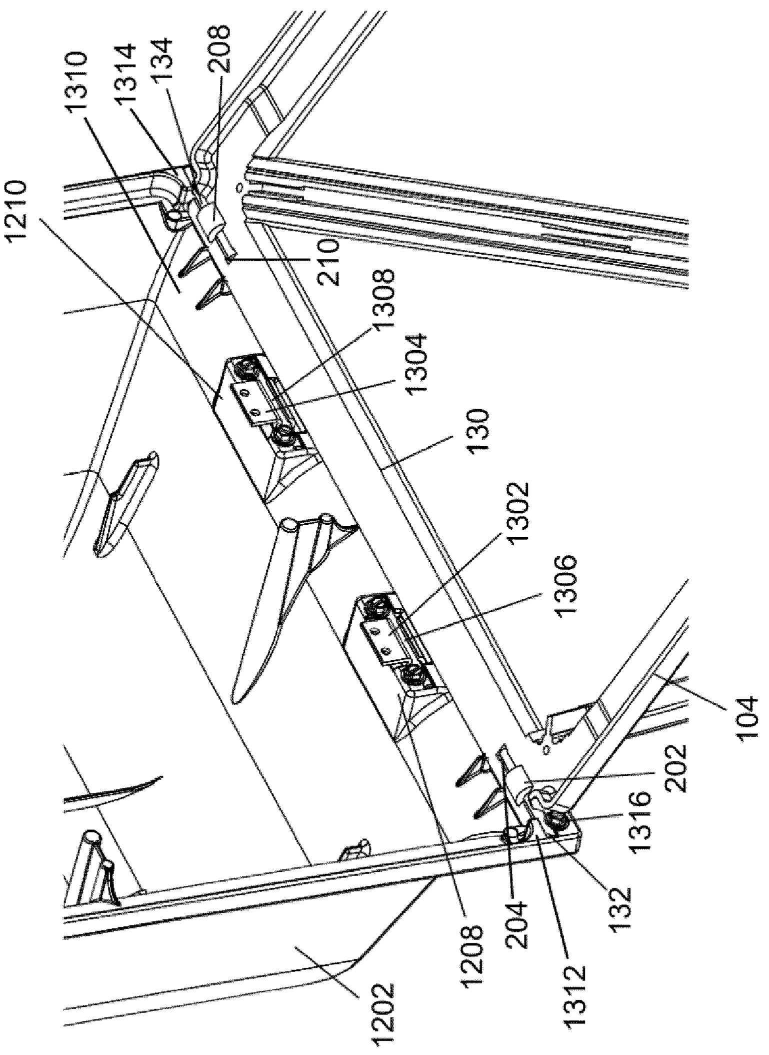
FIG. 13 illustrates a partial view of the top-post light fixture of FIG. 12A without the light engine according to an example embodiment.

FIG. 13 illustrates a partial view of the top-post light fixture 1200 of FIG. 12 without the light engine 1216 according to an example embodiment. Referring to FIGS. 12A-13, in some example embodiments, the hood 1202 is rotatably attached to the carriage 104 by the hinge pins 132, 134. To illustrate, the carriage 104 includes the attachment structures 202, 204 at one end portion of the attachment section 130 and attachment structures 208, 210 at another end portion of the attachment section 130. The hinge pin 132 is positioned in the slots of attachment sections 202, 204 as well as in a slot in the attachment structure 1312 of the hood 1202. For example, the attachment structure 1312 may correspond to the attachment structure 510 of the hood 102 shown in FIG. 6A. The hinge pin 132 may be held in the slot of the attachment structure 1312 by the fastener 1316 in a similar manner as described with respect to the fastener 702 shown in FIG. 7.

In some example embodiments, the hinge pin 134 is positioned in the slots of attachment sections 208, 210 as well as in a slot in the attachment structure 1314 of the hood 1202. For example, the attachment structure 1314 may correspond to the attachment structure 512 of the hood 102 shown in FIG. 6B. The hinge pin 134 may be held in the slot of the attachment structure 1312 by a fastener in a similar manner as described with respect to the fastener 802 shown in FIG. 8.

In some example embodiments, the hood 1202 includes the attachment structures 1208, 1210. For example, the attachment structures 1208, 1210 may be integrally built with a wall 1310 of the hood 1202. A curved section of a hinge bracket 1302 is positioned in a bracket slot of the attachment structure 1208, and a curved section of a hinge bracket 1304 is positioned in a bracket slot of the attachment structure 1210. A hinge pin 1306 is positioned in a slot of the curved section of the bracket 1302 and slots formed in the attachment structure 1208. A hinge pin 1308 is positioned in a slot of the curved section of the bracket 1304 and slots formed in the attachment structure 1210. The hinge pins 1306 and 1308 may be retained in the slots of the attachment structures 1208 and 1210, respectively, by one or more respective fasteners as explained in more detail below with respect to FIGS. 14 and 15. The brackets 1302, 1304 are retained in the respective slots of the attachment structures 1208, 1210 by the respective hinge pins 1306, 1308. The brackets 1302, 1304 are attached to the plate 1204 by fastener (e.g., screws, rivets, etc.) as more clearly shown in FIGS. 18A and 18B.

In some alternative embodiments, the attachment structures 1208, 1210 may be at different locations than shown without departing from the scope of this disclosure. In some alternative embodiments, the hood 1202 may include more or fewer than two attachment structures than shown without departing from the scope of this disclosure. In some alternative embodiments, the attachment structures 1208, 1210 may have a different shape than shown without departing from the scope of this disclosure. In some alternative embodiments, the hood 1202 may rotatably attached to the carriage 104 in a different manner than shown without departing from the scope of this disclosure.

Figure 15:
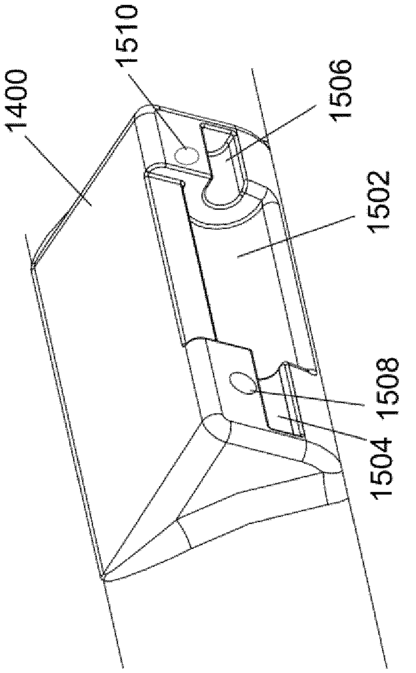
FIGS. 14 and 15 illustrate the attachment structure corresponding to the attachment structures of the hood of the top-post light fixture of FIG. 12A according to an example embodiment.
Figure 17:
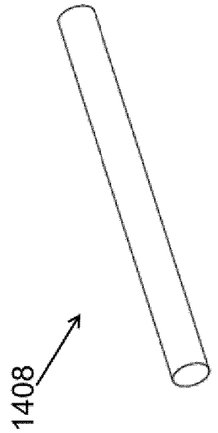
FIG. 17 illustrates the hinge pin used with the attachment structure of FIG. 14 and corresponding to the hinge pins shown in FIG. 13 according to an example embodiment.
Figure 14:
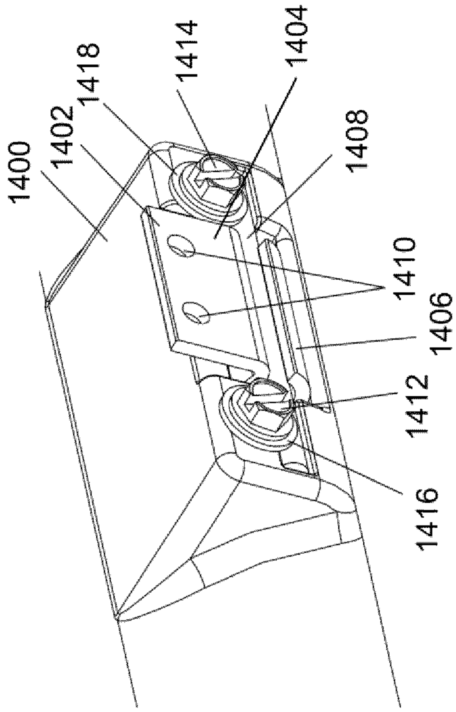
Figure 16:
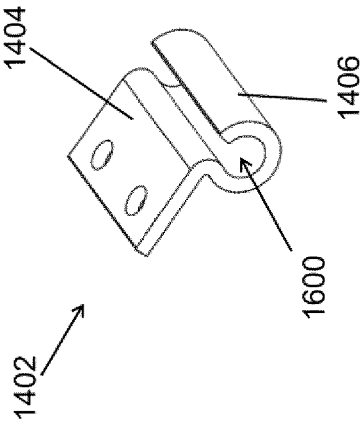
FIG. 16 illustrates the hinge bracket used with the attachment structure of FIG. 14 and corresponding to the hinge brackets shown in FIG. 13 according to an example embodiment.

FIGS. 14 and 15 illustrate an attachment structure 1400 corresponding to the attachment structures 1208, 1210 of the hood 1202 of the top-post light fixture 1200 of FIG. 12A according to an example embodiment. FIG. 16 illustrates the hinge bracket 1402 used with the attachment structure 1400 of FIG. 14 and corresponding to the hinge brackets 1302, 1304 shown in FIG. 13 according to an example embodiment. FIG. 17 illustrates the hinge pin 1408 used with the attachment structure 1400 of FIG. 14 and corresponding to the hinge pins 1306, 1308 shown in FIG. 13 according to an example embodiment.

Referring to FIGS. 12A-17, in some example embodiments, the attachment structure 1400 includes a bracket slot 1502 and pin slots 1504 and 1506 that are at opposite ends of the bracket slot 1502 as shown in FIG. 15. The hinge bracket 1402 may include a plate attachment section 1404 and a curved section 1406. For example, the curved section 1406 may have a c-shaped cross-section, and the plate attachment section 1404 may have a substantially flat surface. At least a portion of the curved section 1406 of the hinge bracket 1402 is rotatably positioned in the bracket slot 1502 of the attachment structure 1400 as shown in FIG. 14. The plate attachment section 1404 of the hinge bracket 1402 may include one or more holes 1410 through which fasteners are inserted to attach the hinge bracket 1402 to the plate 1204 shown in FIGS. 18A, and 18B.

In some example embodiments, the hinge pin 1408 is positioned in the slot 1600 of the hinge bracket 1402 and in the pin slots 1504, 1506 of the attachment structure 1400. The hinge pin 1408 may be retained in the pin slots 1504, 1506 by fasteners 1412, 1414 that are inserted in respective holes 1508, 1510 formed in the attachment structure 1400. To illustrate, the heads of the fasteners 1412, 1414 may prevent the hinge pin 1408 from moving out of the pin slots 1504, 1506 of the attachment structure 1400. The fastener 1412 may include a washer 1416, and the fastener 1414 may include a washer 1418. For example, the washers 1416, 1418, instead of the heads of the fasteners 1412, 1414, may be in contact with the hinge pin 1408 as shown in FIG. 14 to retain the hinge pin 1408 in the pin slots 1504, 1506. By retaining the hinge pin 1408 in the pin slots 1504, 1506, the fasteners 1412, 1414 retain the curved section 1406 of the hinge bracket 1402 in the bracket slot 1502 such that the hinge bracket 1402 is rotatably attached to the attachment structure 1400.

In some alternative embodiments, the attachment structure 1400 may have a different shape than shown without departing from the scope of this disclosure. In some alternative embodiments, the hinge bracket 1402 and the hinge pin 1408 may have a different shape than shown without departing from the scope of this disclosure. In some alternative embodiments, the attachment structure 1400 may have different slots or the slots of the attachment structure 1400 may be at different locations than shown without departing from the scope of this disclosure. In some alternative embodiments, the hinge pin 1408 may be retained by means other than the screws 1412, 1414 without departing from the scope of this disclosure.

Figure 18B:
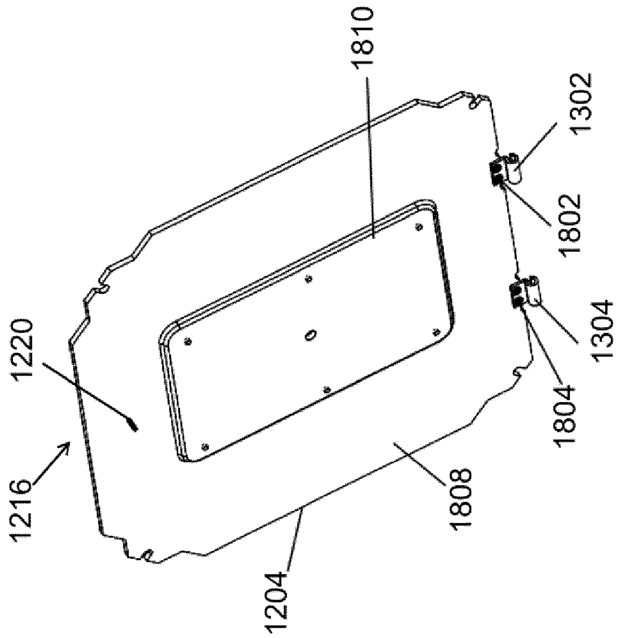
FIGS. 18A and 18B illustrate different views of the light engine of the top-post light fixture of FIG. 12A according to an example embodiment.
Figure 18A:
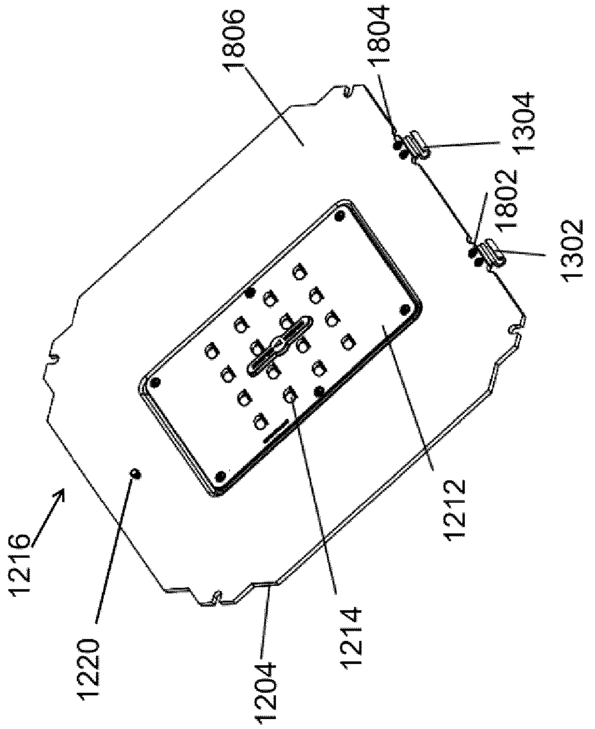

FIGS. 18A and 18B illustrate different views of the light engine 1216 of the top-post light fixture of FIG. 12A according to an example embodiment. FIG. 18A shows a side of the light engine 1216 that faces toward the cavity 116 of the carriage 104 when the hood 1202 is closed over the carriage 104, and FIG. 18B shows the side of the light engine 1216 that faces away from the cavity 116 of the carriage 104 when the hood 1202 is closed over the carriage 104. Referring to FIGS. 12-18B, in some example embodiments, the light engine 1216 includes the plate 1204, and the light module 1212 that includes light sources 1212 is positioned in a cavity of a recess section 1810 of the plate 1204. The light module 1212 may be flush with a surface 1806 of a section of the plate 1204 that surrounds the recess section

1810 on one side of the plate 1204, and the recess section 1810 may be raised above a surface 1808 of the section of the plate 1204 that surrounds the recess section 1810 on the opposite side of the plate 1204.

In some example embodiments, the hinge bracket 1302 is fixedly attached to plate 1204 by one or more fasteners 1802 (e.g., screws, rivets, etc.), and the hinge bracket 1304 is fixedly attached to the plate 1204 by one or more other fasteners 1804 (e.g., screws, rivets, etc.). The one or more fasteners 1802, 1804 extend through the one or more holes 1410 (shown in FIG. 14 with respect to the representative bracket 1402) in the respective bracket 1302, 1304. Because the hinge brackets 1302 and 1304 are rotatably attached to the attachment structures 1208 and 1210, respectively, the plate 1204 is rotatable with respect to the hinge brackets 1302, 1304.

In some example embodiments, the thumb screw 1220 may be used to secure the plate 1204 to the hood 1202 such that the plate 1204 does not rotate, for example, when it is desired to keep the opening 148 of the carriage 104 open. For example, the plate 1204 may be attached to the hood 1202 by the thumb screw 1220 in the position shown in FIG. 12A.

In some alternative embodiments, the light module 1212 may not be recessed. For example, the plate 1204 may not include the recess section 1810 without departing from the scope of this disclosure. In some alternative embodiments, the light module 1212 may include more or fewer light sources (e.g., LED light sources) than shown without departing from the scope of this disclosure. In some alternative embodiments, more or fewer than two hinge brackets may be attached to the plate 1204 without departing from the scope of this disclosure. In some alternative embodiments, the hinge brackets 1302, 1304 may be at different locations than shown without departing from the scope of this disclosure. In some alternative embodiments, the plate 1204 may have a different shape than shown without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

The invention claimed is:

1. A light fixture, comprising:

a carriage;

a hood rotatably attached to the carriage;

a light engine comprising a plate and a light module, wherein the light module is attached to the plate; and wherein a first hinge pin is positioned in a slot of a first attachment structure of the hood, a slot of a first attachment structure of the plate, and slots of first attachment structures of the carriage and wherein a second hinge pin is positioned in a slot of a second attachment structure of the hood 102), a slot of a second attachment structure of the plate, and slots of second attachment structures of the carriage;

and wherein the hood and the plate are rotatably attached to the carriage using the first hinge pin and the second hinge pin.

2. The light fixture of claim 1, wherein the plate is rotatable to a position such that the plate covers an opening of the carriage.

3. The light fixture of claim 2, wherein the plate is rotatable to a second position away from the opening of the carriage such that a cavity of the carriage is accessible through the opening of the carriage.

4. The light fixture of claim 3, wherein the light module is positioned in a recess section formed in the plate and wherein the light module is accessible without completely removing the plate from the carriage.

5. The light fixture of claim 1, wherein the light module includes a light emitting diode (LED) module.

6. The light fixture of claim 5, wherein the light engine further comprises a driver configured to provide power to the light module and wherein the light module and the driver are on opposite sides of the plate.

7. The light fixture of claim 5, further comprising a driver configured to provide power to the light module, wherein the driver is attached to the hood in the cavity of the hood.

8. The light fixture of claim 1, wherein the hood and the plate are rotatably attached to the carriage such that the hood is rotatable independent of the plate.

9. The light fixture of claim 1, wherein the plate is detachable from the carriage without first detaching the hood from the carriage.

10. The light fixture of claim 1, wherein the first attachment structure of the plate and the second attachment structure of the plate are u-shaped.

11. The light fixture of claim 1, wherein the first attachment structure of the plate and the second attachment structure of the plate have a cylindrical shape.

12. The light fixture of claim 1, wherein the first hinge pin is retained in the slot of the first attachment structure of the hood by a first fastener, wherein the second hinge pin is retained in the slot of the second attachment structure of the hood by a second fastener, wherein the hood is detachable from the carriage by removing the first fastener and the second fastener.

13. The light fixture of claim 1, wherein the carriage comprises a top frame, wherein the first attachment structures of the carriage are formed in the top frame of the carriage and comprise a first curved attachment structure and a second curved attachment structure that are horizontally offset from each other and that extend in opposite directions with respect to the top frame.

* * * * *